(12) United States Patent
Vandeputte (10) Patent No.: US 11,795,824 B2
(45) Date of Patent: Oct. 24, 2023

(54) AIRFOIL PROFILE FOR A BLADE IN A TURBINE ENGINE

(71) Applicant: GENERAL ELECTRIC COMPANY, Schenectady, NY (US)

(72) Inventor: Thomas William Vandeputte, Scotia, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/537,818

(22) Filed: Nov. 30, 2021

(65) Prior Publication Data
US 2023/0167742 A1 Jun. 1, 2023

(51) Int. Cl.
*F01D 5/14* (2006.01)
*F01D 5/18* (2006.01)

(52) U.S. Cl.
CPC .............. *F01D 5/141* (2013.01); *F01D 5/18* (2013.01); *F05D 2220/30* (2013.01); *F05D 2230/60* (2013.01); *F05D 2260/20* (2013.01)

(58) Field of Classification Search
CPC .......... F01D 5/141; F01D 5/145; F01D 5/147; F01D 9/041; F01D 5/20; F01D 5/18; F01D 5/187; F01D 1/023; F01D 17/162; F01D 5/02; F01D 5/021; F01D 9/065; F05D 2240/301; F05D 2240/304; F05D 2240/303; F05D 2240/307; F05D 2220/30; F05D 2220/32; F05D 2240/122; F05D 2250/70; F05D 2250/38; F05D 2240/12; F05D 2240/121; F05D 2240/125; F05D 2250/20; F05D 2230/60; F05D 2260/20; F04D 29/324; F04D 29/384; F04D 29/667; F04D 29/023; F04D 29/544; F04D 29/522; F04D 29/681; F04D 29/164; F05B 2240/31
See application file for complete search history.

(56) References Cited

U.S. PATENT DOCUMENTS

| | | | |
|---|---|---|---|
| 3,166,295 A | 1/1965 | Szewalski et al. | |
| 5,326,221 A | 7/1994 | Amyot et al. | |
| 6,709,239 B2 | 3/2004 | Chandraker | |
| 7,047,167 B2 | 5/2006 | Yamaguchi et al. | |
| 7,217,101 B2 | 5/2007 | Harvey | |
| 8,360,731 B2 | 1/2013 | Nash et al. | |
| 8,998,577 B2 * | 4/2015 | Gustafson | F01D 5/142 415/198.1 |
| 9,085,984 B2 * | 7/2015 | Ristau | F01D 5/141 |

(Continued)

FOREIGN PATENT DOCUMENTS

KR 20200105863 A 9/2020

*Primary Examiner* — Eric J Zamora Alvarez
(74) *Attorney, Agent, or Firm* — McGarry Bair PC (57) ABSTRACT

An apparatus and method for an engine component having a working airflow separated into a cooling airflow and a combustion airflow, the engine component comprising a plurality of circumferentially spaced airfoils rotatable about a centerline defining an axial direction, each airfoil comprising an outer wall bounding an interior and defining a pressure side and a suction side extending between a leading edge and a trailing edge to define a chord-wise direction and extending between a root and a tip along a span-wise direction to define a span length; wherein each of the airfoils have an unguided turning angle to stagger angle ratio defined with respect to a percentage of the span length.

20 Claims, 8 Drawing Sheets

(56) References Cited

U.S. PATENT DOCUMENTS

| | | |
|---|---|---|
| 9,869,191 B2 | 1/2018 | Gallagher et al. |
| 11,060,410 B2 | 7/2021 | Blair et al. |
| 2020/0182065 A1 | 6/2020 | Fredmonski et al. |

\* cited by examiner

AIRFOIL PROFILE FOR A BLADE IN A TURBINE ENGINE

TECHNICAL FIELD

The disclosure generally relates to an engine component with an airfoil profile, and more specifically to a blade with a changing turn along a span length of the blade.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Turbine blades can be subject to flow regimes which lend themselves easily to the formation of vortex structures near the hub and tip sections of the airfoil. Rotating blades, due to the physical gap required to allow for relative motion between the rotating blade tip and the stationary case structure, will form additional vortex structures due to the leakage of flow over the tip of the blade. Such vortex structures limit the amount of work transferred to the compressor, and hence the total thrust or power capability of the engine. Moreover, controlling over tip leakage flow and associated tip vortex driven losses are significantly important with un-shrouded blades. To control the formation and growth of these vortex structures, local blade loading distributions are uniquely adjusted to minimize the losses that these structures generate.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Aspects of the disclosure described herein are directed generally to an airfoil for a gas turbine engine and, more particularly, to an unshrouded blade airfoil. While focused on an unshrouded blade, it should be understood that the disclosure herein is not limited to unshrouded blades and can be generally directed to an airfoil in any part of the engine.

There are a number of considerations that dictate whether a turbine blade will be shrouded or unshrouded. Pull loads (stress) are a consideration. Tip shrouds add weight, which can result in unwanted increase pull loads. Depending on the material from which the blade is made, in some cases certain materials cannot support the increase in pull loads. For high pressure turbine (HPT) airfoils, which are highly cooled, a low airfoil count is preferred to keep cooling flow to a minimum. This drives a high blade-to-blade distance between the tips, which means long shrouds, circumferentially. This can lead to stress problems for the tip section. Furthermore, high temperatures in the HPT would require that blades with shrouds would likely require internal cooling within the shroud structure, driving up cost and manufacturing time. Additionally, the shroud cooling flow will result in a lower cycle efficiency due to the higher parasitic bleeds from the compressor.

Unshrouded blades in the HPT require a balance between aerodynamic and structural optimization in order to ensure efficiency of the engine along with life span of the blade. An airfoil profile as described herein is defined by a stagger and an unguided turning (UGT) angle, both of which are dependent on solidity of the blade design.

Managing peak Mach numbers and suction surface pressure diffusion between the peak Mach number and the airfoil trailing edge requires a carefully tailored airfoil profile. The local airfoil loading can vary between a root, or hub region, of the airfoil and a tip region radially spaced from the hub region, requiring different airfoil profile strategies at different span locations. As solidity is decreased, distributing loading further to the front of the airfoil, with unique considerations at the hub and tip regions, can optimize the management of Mach numbers and suction surface pressure diffusion. Airfoil loading design requires a balance between peak Mach number and suction surface pressure diffusion. A high peak Mach number can result in shock losses, and can require a high level of suction surface pressure diffusion. High amounts of diffusion, high rates of diffusion, and especially both in combination, leads to rapid growth of the suction surface boundary layer. In the extreme, the boundary layer may separate from the airfoil surface, driving a very high loss. Even if attached, an excessively thick suction surface boundary layer can merge with the trailing edge wake to produce higher than necessary losses. It will be discussed in more detail herein that a lower stagger angle coupled with a higher UGT angle at the hub region controls passage vortex growth, while a higher stagger angle with a lower UGT angle at the tip region controls leakage vortex strength.

Hub passage vortex growth is a function of overall acceleration through the passage, the local airfoil loading, and the length of the passage. A lower stagger angle is associated with a smaller true chord of the airfoil for the same axial chord. This means that a streamwise length of the passage is smaller, resulting in a smaller surface area, which reduces drag and/or profile loss.

A higher UGT means that the local loading (pressure distribution) will be concentrated towards the trailing edge of the airfoil. The passage vortex initiates due to the velocity defect in the hub boundary layer interacting with the leading edge. Once the vortex starts, its growth will be enhanced by the pressure differential between the suction and pressure sides to two adjacent airfoils. By concentrating the high-pressure differential on the rear of the airfoil, the growth of the passage vortex is minimized.

The same driving mechanisms listed for the hub also apply at the tip. The tip, however, also has the additional complication of a leakage flow, where flow from the pressure side migrates over the tip and merges with flow on the suction side. The distribution of the leakage flow from leading edge to trailing edge will depend on a pressure gradient, or amount of pressure change, across the tip (driven by loading) and a resistance path, a descriptor of the type of path along which the flow travels, for the leakage area (driven by airfoil width at a given axial location). Since the leakage flow produces a strong vortex upon re-entering the main flow path along the suction side, the loading distribution is altered to minimize the unique growth and strength attributes of the tip leakage vortex. Unlike the hub, the loading distribution at the tip trends towards concentrating the lift towards the leading edge, where the leakage resistance is high due to the high airfoil thickness near the leading edge. Reducing the pressure gradient towards the thinner aft chordal sections of the airfoil reduces further build-up of the leakage vortex strength.

For purposes of illustration, the present disclosure will be described with respect to the turbine for an aircraft gas turbine engine. It will be understood, however, that aspects of the disclosure described herein are not so limited and may have general applicability within an engine, including compressors, power generation gas turbines, as well as in non-aircraft applications, such as other mobile applications and non-mobile industrial, commercial, and residential applications.

As used herein, "High" and "Low" are descriptors regarding a relative change in the environment and/or relative numerical values with respect to each other.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
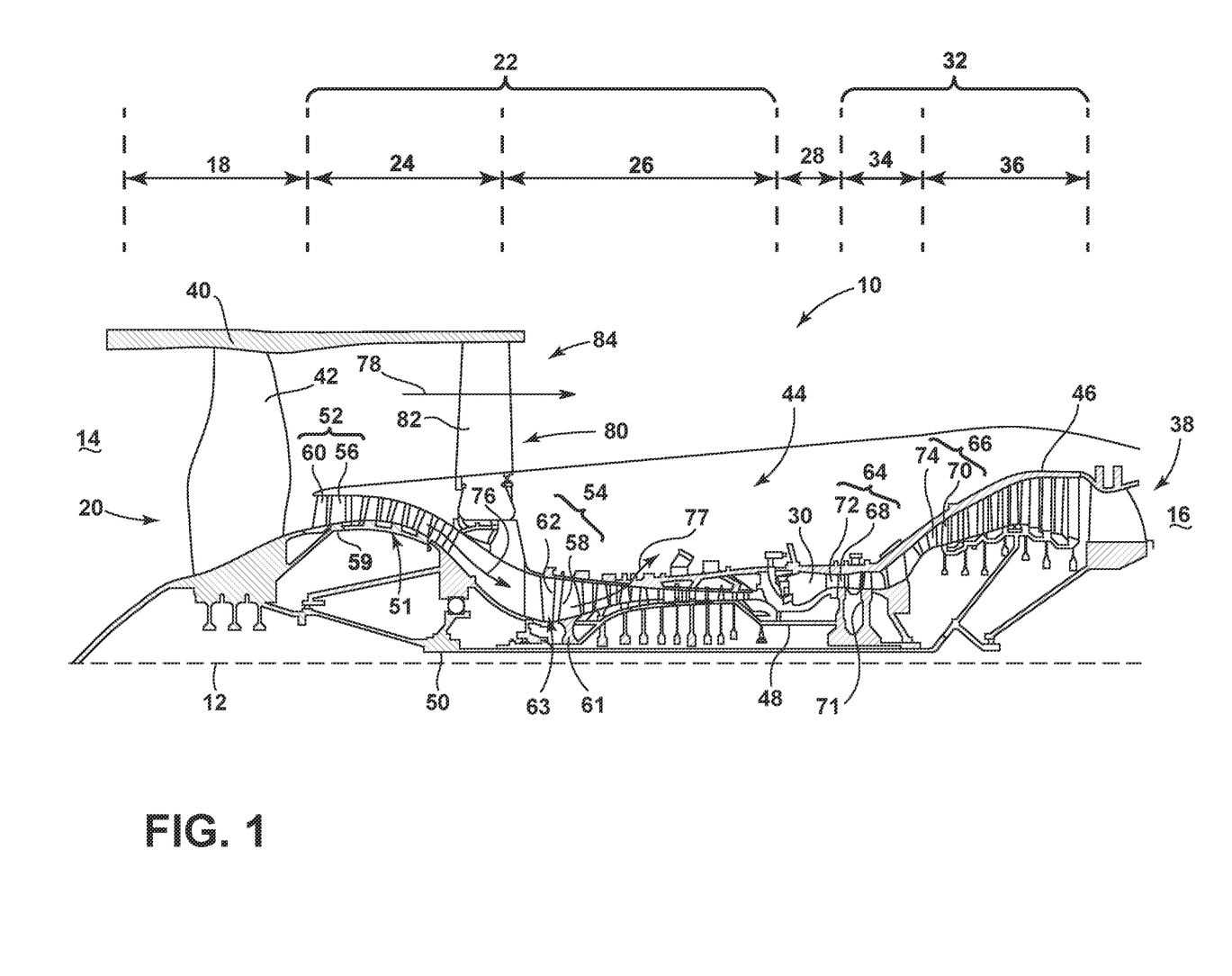
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and an LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the centerline 12 of the engine 10 drivingly connects the HP turbine 34 to the HP compressor 26. An LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor section 22 and turbine section 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air 76 can be drawn from the compressor section 22 as bleed air 77. The bleed air 77 can be drawn from the pressurized air 76 and provided to engine components requiring cooling. The temperature of pressurized air 76 entering the combustor 30 is significantly increased above the bleed air 77 temperature. The bleed air 77 may be used to reduce the temperature of the core components downstream of the combustor.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
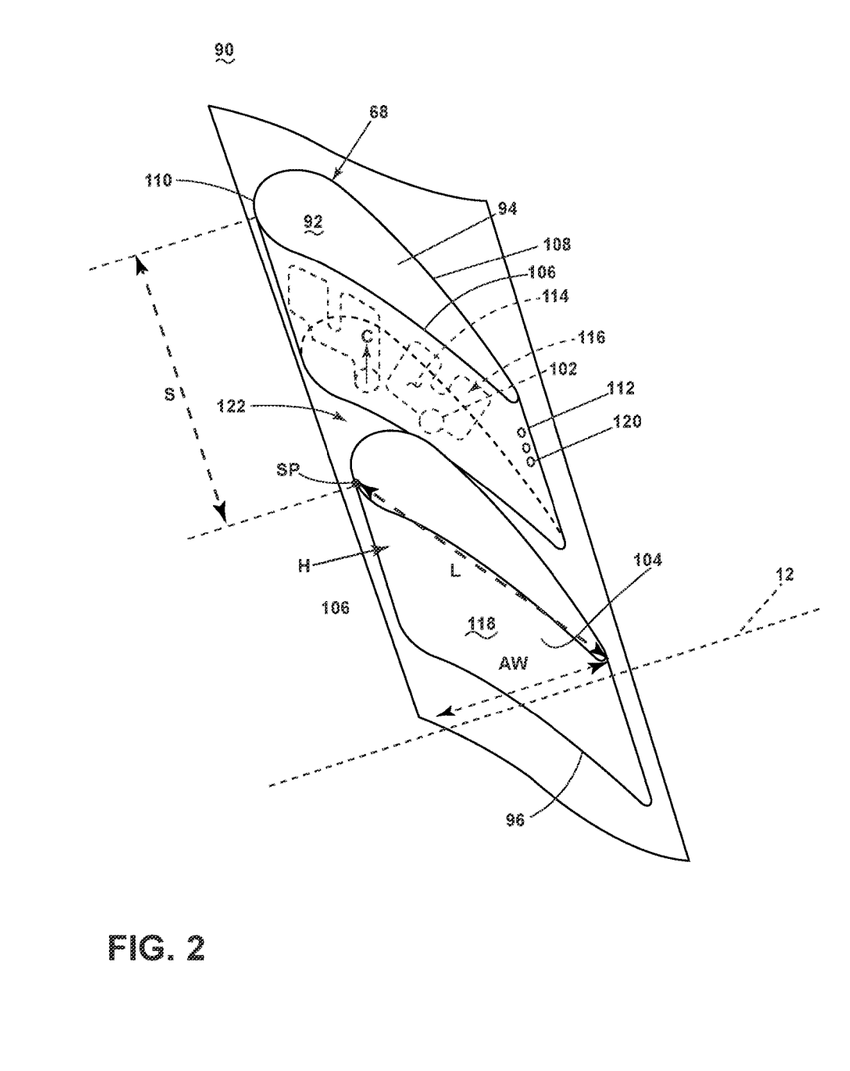
FIG. 2 is a top view of a pair of blades from the gas turbine engine of FIG. 1.

Referring now to FIG. 2, an engine component in the form of the turbine blades 68 of the engine 10 from FIG. 1 is shown. A plurality of circumferentially spaced airfoils 92 rotatable about the centerline 12 is illustrated as a pair of turbine blades 90. Alternatively, the engine component can be a vane, a strut, a service tube, a shroud, or a combustion liner in non-limiting examples, or any other engine component that can require or utilize cooling passages.

The airfoil 92 can extend radially between a tip 94 and a root 96 defining a span-wise direction therebetween. In one aspect of the disclosure herein the tip 94 is an unshrouded tip as illustrated. In other words, there is not a tip rail at the tip 94. The airfoil 92 can mount to a platform 98 at the root 96.

The platform 98 helps to radially contain the turbine engine mainstream airflow. Additionally, the airfoil 92 can include an outer wall 104 having a first side 106 and a second side 108. The outer wall 104 further extends between an upstream edge 110 and a downstream edge 112 to define a streamwise direction therebetween. It should be understood that the upstream edge 110 can be a leading edge of the airfoil 92 and the downstream edge 112 can be a trailing edge of the airfoil 92. Further, the first side 106 can be a pressure side and the second side 108 can be a suction side of a turning blade as illustrated. It is also further contemplated that the airfoil 92 can be a non-turning vane, by way of non-limiting example a frame fairing. It is also further contemplated that neither the first or second sides 106, 108 are curved to form a pressure side and/or suction side. The outer wall 104 can define an interior 114 in which at least one cooling conduit 116, shown in dashed line as two exemplary cooling conduits 116, can be located.

A true chord length (L) is measured along a straight line extending between the leading edge 110 and the trailing edge 112 of the airfoil 92. An axial chord length (AW) is defined as the axial distance from the forward-most to the aft-most point of the airfoil 92. The number of blades arranged circumferentially about the centerline 12 can vary. The number of blades influences a spacing (s) associated with the arrangement and defined as a distance between consecutive airfoils 92. A ratio (AW/s) between the axial chord length (AW) and the spacing (s) is known as a parameter called solidity. A higher solidity number is generally associated with a higher number of blades, given the axial chord length (AW) remains the same and vice versa.

In operation, a hot gas flow (H), such as a combustor flow, can pass along an exterior 118 of the outer wall 104 of the airfoil 92 to define a heated surface. A cooling fluid flow (C) can be provided to the at least one cooling conduit 116 via an inlet 102. The cooling fluid flow (C) can be provided throughout the interior 114 and exhausted through any exemplary cooling hole 120 as a cooling film. Any surfaces facing the cooling fluid flow (C) can be defined as a cooled surface.

A stagnation point (SP) is located on the exterior 118 where the hot gas flow (H) contacts the airfoil 92 at an angle of ninety degrees and the velocity of the hot gas flow (H) is zero. In some cases, the stagnation point (SP) is co-linear with the leading edge 110, however it should be understood that the stagnation point (SP) can vary a certain degree along the leading edge 110. Furthermore, the stagnation point (SP) can temporarily or permanently vary from all or part of the leading edge 110 during all or part of the operational conditions of the engine.

Figure 3:
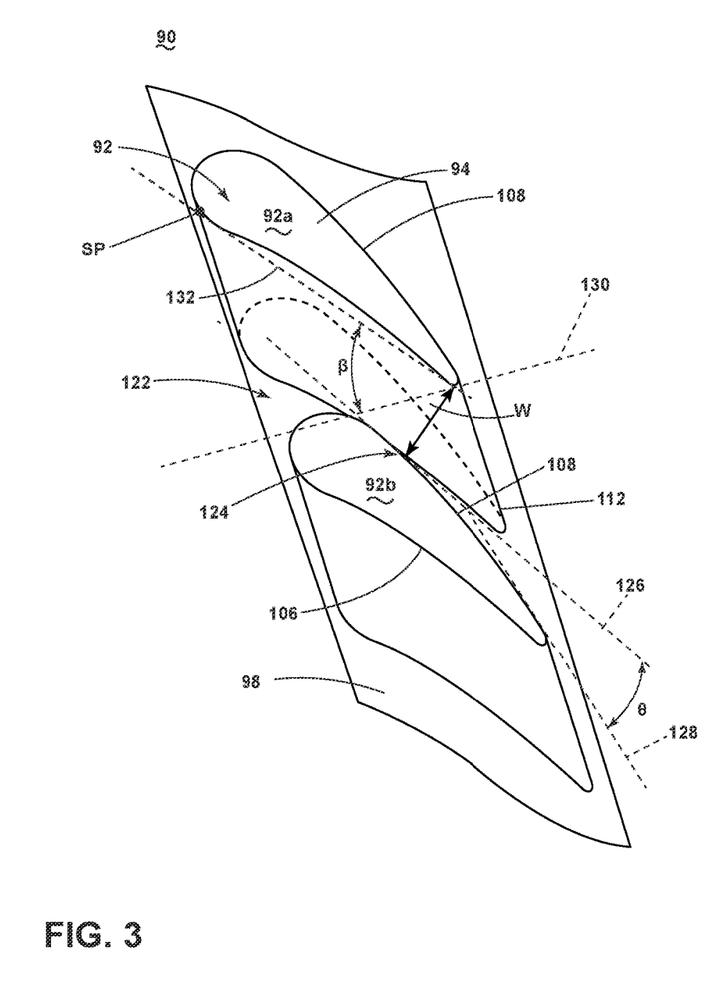
FIG. 3 is the same top view of FIG. 2 illustrating an unguided turning angle and a stagger angle.

Turning to FIG. 3 the set of turbine blades 90 is illustrated with some part numbers removed for clarity. The set of turbine blades 90 includes consecutive airfoils 92, a first airfoil 92*a* and a second airfoil 92*b*, spaced from each other to define a throat 122 through which the hot gas flow (H) flows. The throat 122 has a width (W) defined as a minimum distance between the trailing edge 112 of the first airfoil 92*a* and a point 124 along the second side 108 (e.g. suction side) of the second airfoil 92*b*. A first line 126 can extend through point 124 tangent to the second side 108. In other words, the first line 126 is perpendicular to the width (W) measurement. A second line 128 can extend tangent to the second side 108 through the trailing edge 112 of the second airfoil 92*b*. An unguided turning (UGT) angle (θ) is defined as the measurement between the first line 126 and the second line 128.

An axial line 130 can extend generally, within 5% of, parallel to the centerline 12 (FIG. 1) and intersect with the trailing edge 112 of the first airfoil 92a. A chord line 132 extends between the leading edge 110 and the trailing edge 112 of the first airfoil 92a. A stagger angle (β) is defined as the measurement between the axial line 130 and the chord line 132.

While the first line 126 and the second line 128 are illustrated as tangent to the second airfoil 92b and the axial line 130 and chord line 132 are illustrated as intersecting the trailing edge 112 of the first airfoil 92a, it should be understood that these measurements can be applied to all airfoils 92 described herein.

Figure 4:
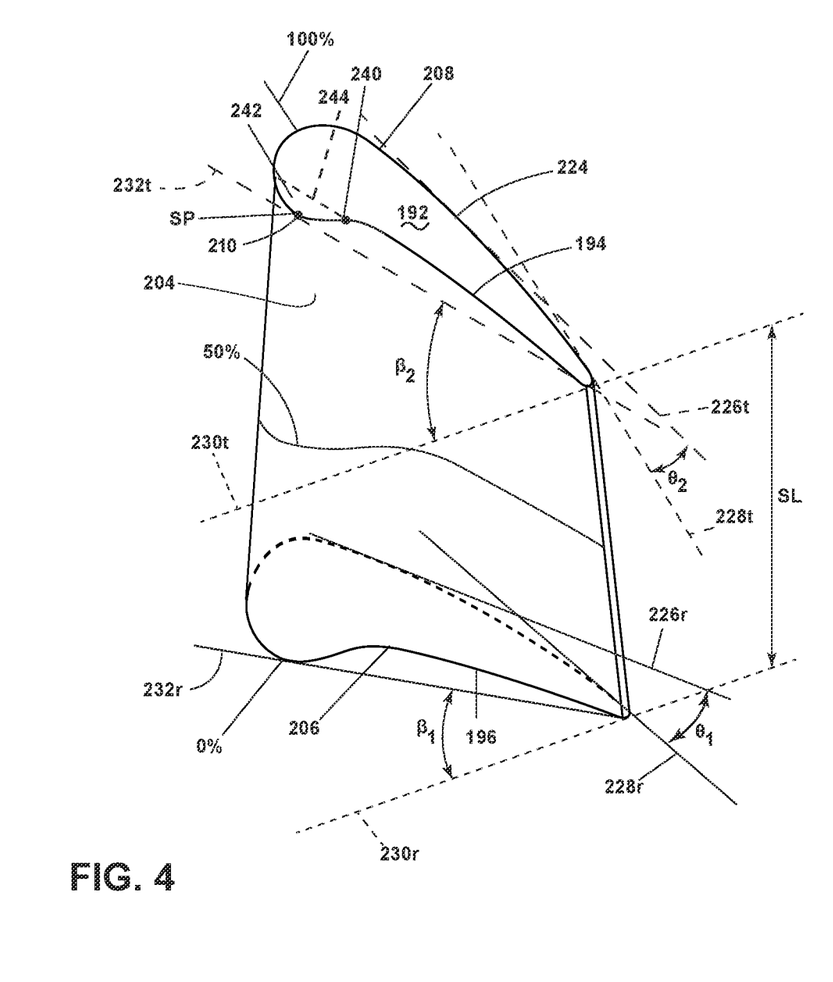
FIG. 4 is a perspective view of an exemplary blade with varying unguided turning angles and stagger angles between a root and a tip of the blade.

FIG. 4 is a perspective view of an airfoil 192, a variation of the airfoil 92, according to another aspect of the disclosure herein. The airfoil 192 is substantially similar to the airfoil 92, therefore, like parts will be identified with like numerals increased by 100. It should be understood that the description of the like parts of the airfoil 92 applies to the airfoil 192 unless otherwise noted.

The airfoil 192 includes an inflection point 240 along a pressure side 206 near a leading edge 210. The inflection point 240 defines a beginning of an enlarged portion 242 along the pressure side 206 extending toward the leading edge 210. The enlarged portion 242 is bound by an outer wall 204 between the inflection point 240 the pressure side 206, the leading edge 210, a second side 208 (e.g. suction side) and a dashed line 244 extending from the second side 208 back to the inflection point 240. The enlarged portion 242 can enable more space in the interior 114 for cooling conduits 116 (FIG. 2).

Further, the enlarged portion 242 can increase stagnation point (SP) stability when increasing the stagger angle (β) at a tip 194 of the airfoil 192. An inlet flow angle is the trajectory of air flow as it enters a plane at the leading edge 210 of the airfoil 192. At different engine operating conditions, where the turbine rotor may speed up or slow down, the inlet flow angle can change, which implies that the stagnation point (SP) can change as well. If the pressure side is too flat, as illustrated by dashed line 244, small changes to the inlet flow angle can result in large changes to the stagnation point (SP) location. This can have significant implications for cooling film coverage and durability. The enlarged portion 242 can be implemented in highly staggered tips like tip 194 with a high stagger angle (β), for minimizing or eliminating any movement of the stagnation point (SP).

A distance between the tip 194 and a root 196 of the airfoil 192 is defined as the span length (SL) of the airfoil 192. The UGT angle (θ) and the stagger angle (β) can vary along the span length (SL). A first line 226r, 226t located at the root 196 and tip 194 respectively, can extend through a point 224 tangent to the second side 208. A second line 228r, 228t located at the root 196 and tip 194 respectively can extend tangent to the second side 208 through the trailing edge 212 of the airfoil 192. As is illustrated, the UGT angle (θ) can change from a first UGT angle (θ₁) at the root 196 to a second UGT angle (θ₂) at the tip 194. An axial line 230r, 230t located at the root 196 and tip 194 respectively can extend generally, within 5% of, parallel to the centerline 12 (FIG. 1) and intersect with the trailing edge 212 of the airfoil 192. A chord line 232r, 232t located at the root 196 and tip 194 respectively can extend between the leading edge 210 and the trailing edge 212 of the airfoil 192. The stagger angle (β) can change from a first stagger angle (β₁) at the root 196 to a second stagger angle (β₂) at the tip 194.

The UGT angle (θ) can decrease along the span length (SL) moving from the root 196 toward the tip 194. By way of non-limiting example at 0% of the span length (SL), or at the root 96, the UGT angle (θ) can be 30°, at 50% the span length (SL) the UGT angle (θ) can be 23°, and at 100% the span length (SL), or the tip 94, the UGT angle (θ) can be 10°.

The stagger angle (β), on the other hand, can increase along the span length (SL) moving from the root 196 toward the tip 194. By way of non-limiting example at 0% of the span length (SL), or at the root 96, the stagger angle (β) is 47°, at 50% the span length (SL) the stagger angle (β) is 53° and at 100% the span length (SL), or the tip 94, the stagger angle (β) is 57°.

Figure 5A:
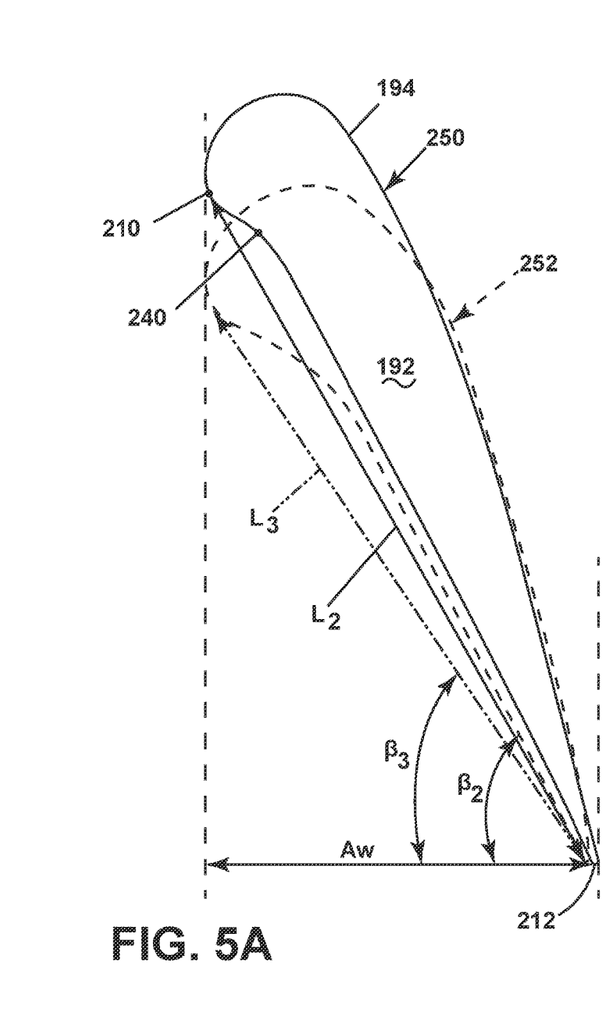
FIG. 5A is a top down view of an outline of an airfoil profile of the blade at the tip.

FIG. 5A is a top down view of an outline of an airfoil profile 250 for airfoil 192 at the tip 194 shown in solid line. A dashed line represents a typical or known airfoil profile 252 at the tip 194. It can be seen that the stagger angle (β₂) is increased at the tip 194 with respect to a stagger angle (β₃) of the typical airfoil profile 252. Further, the airfoil profile 250 is elongated such that a true chord length (L₂) at the tip 194 is greater than a true chord length (L₃) of the typical airfoil profile 252.

Figure 5B:
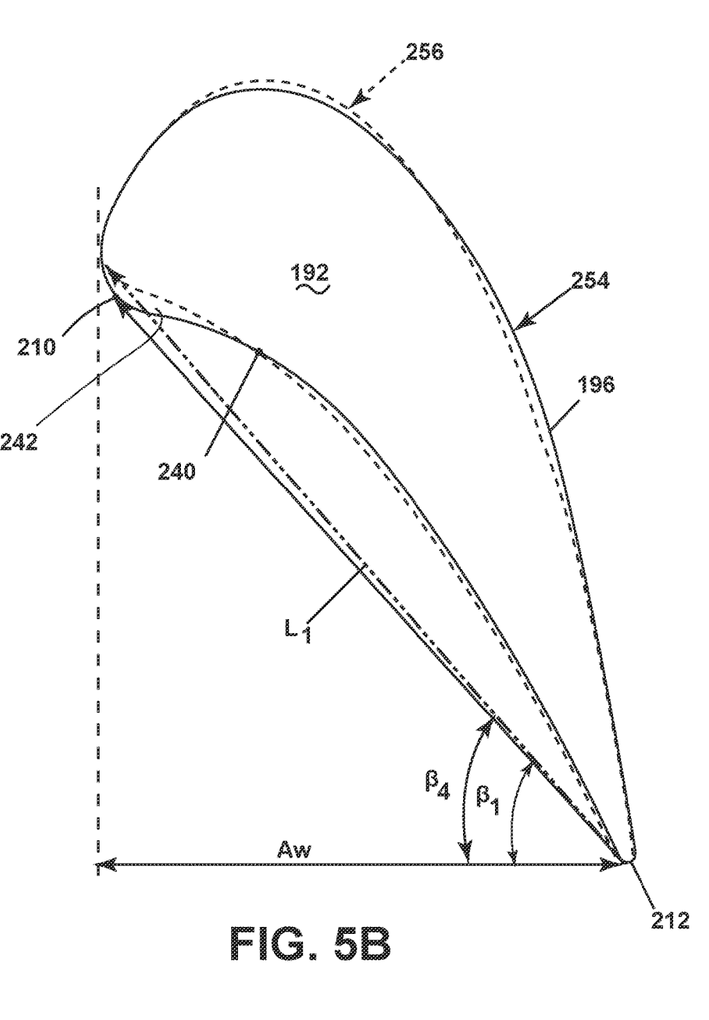
FIG. 5B is a top down view of an outline of an airfoil profile of the root at the tip.

FIG. 5B is a top down view of an outline of an airfoil profile 254 for airfoil 192 at the root 196. A dashed line represents the typical or known airfoil profile 256 at the root 196. It can be seen that the stagger angle (β₁) is increased at the tip 194 with respect to a stagger angle (β₄) of the typical airfoil profile 256. The inflection point 240 and in turn enlarged portion 242 is more pronounced with respect to the typical airfoil profile 256. As previously described herein the enlarged portion 242 allows for an elongated airfoil profile having a stabilized location for stagnation.

Figure 6:
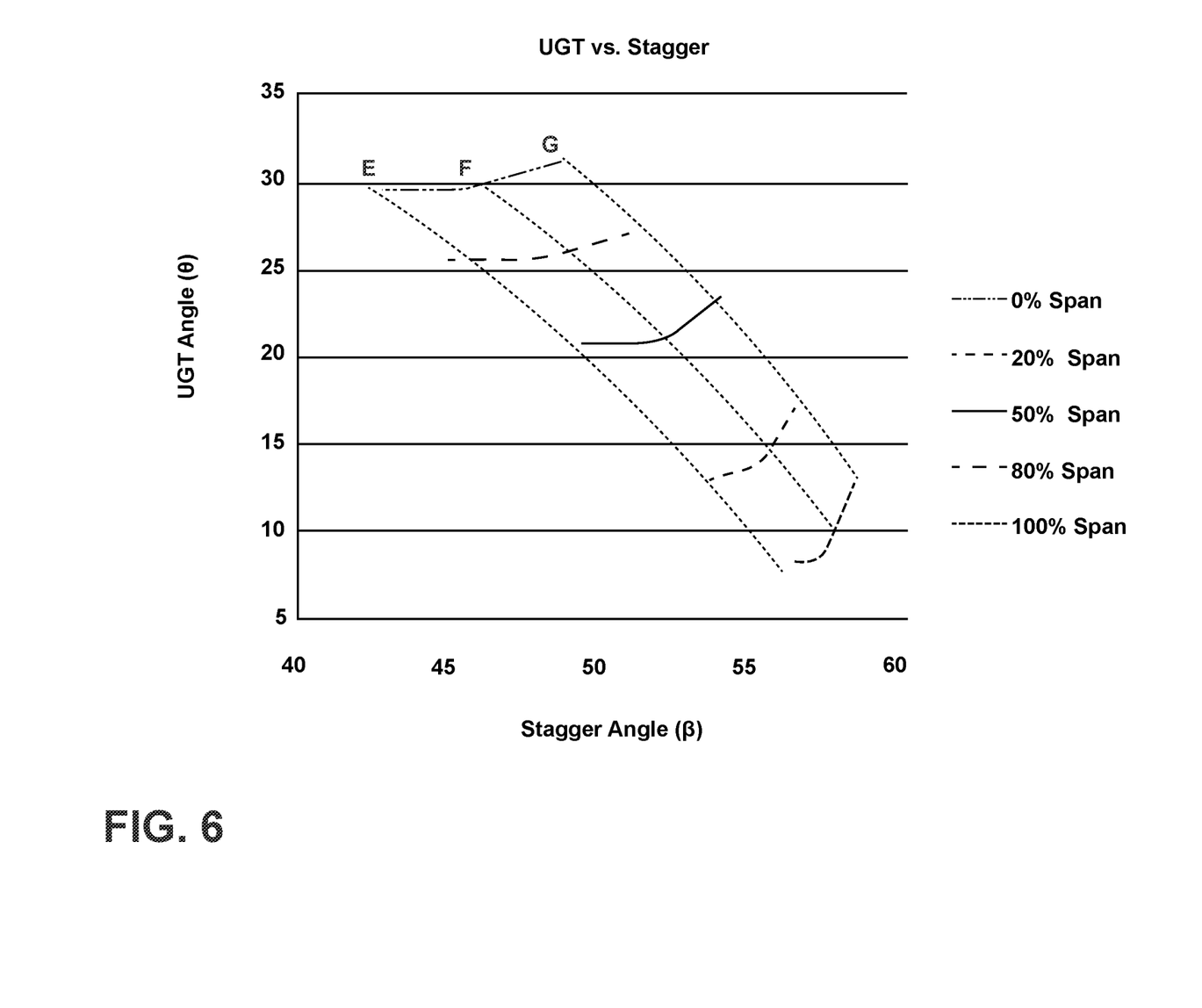
FIG. 6 is a graph of an unguided turning angle value versus stagger angle value.

Turning to FIG. 6 a graph of UGT angle (θ) vs stagger angle (β) is illustrated at different span lengths and for different blade arrangements. The graph includes lines associated with varying span lengths (SL) including, 0%, 20%, 50%, 80% and 100%. Furthermore, the graph includes lines associated with different blade arrangements represented by varying solidity values 'E', 'F', and 'G'. Moving from left to right on the graph represents a decrease in solidity such that value 'E' is larger than value 'F' which is larger than value 'G'. The solidity value 'G' can be between 0.4 and 0.6. The solidity value 'G' can also be associated with a lower number of airfoils circumferentially arranged around the centerline 12 than the arrangement represented by the solidity value 'E'. The solidity value 'E' can range between 0.6 and 0.8 and the solidity value 'F' can range between 0.5 and 0.7. Both the UGT angle (θ) and the stagger angle (β) are generally greater at all points along the span length (SL) with the solidity of value C when compared to the solidity of value 'E'. Optimizing efficiency while controlling for tip losses requires consideration of the solidity, the stagger angle (β), and the UGT angle (θ).

Figure 7:
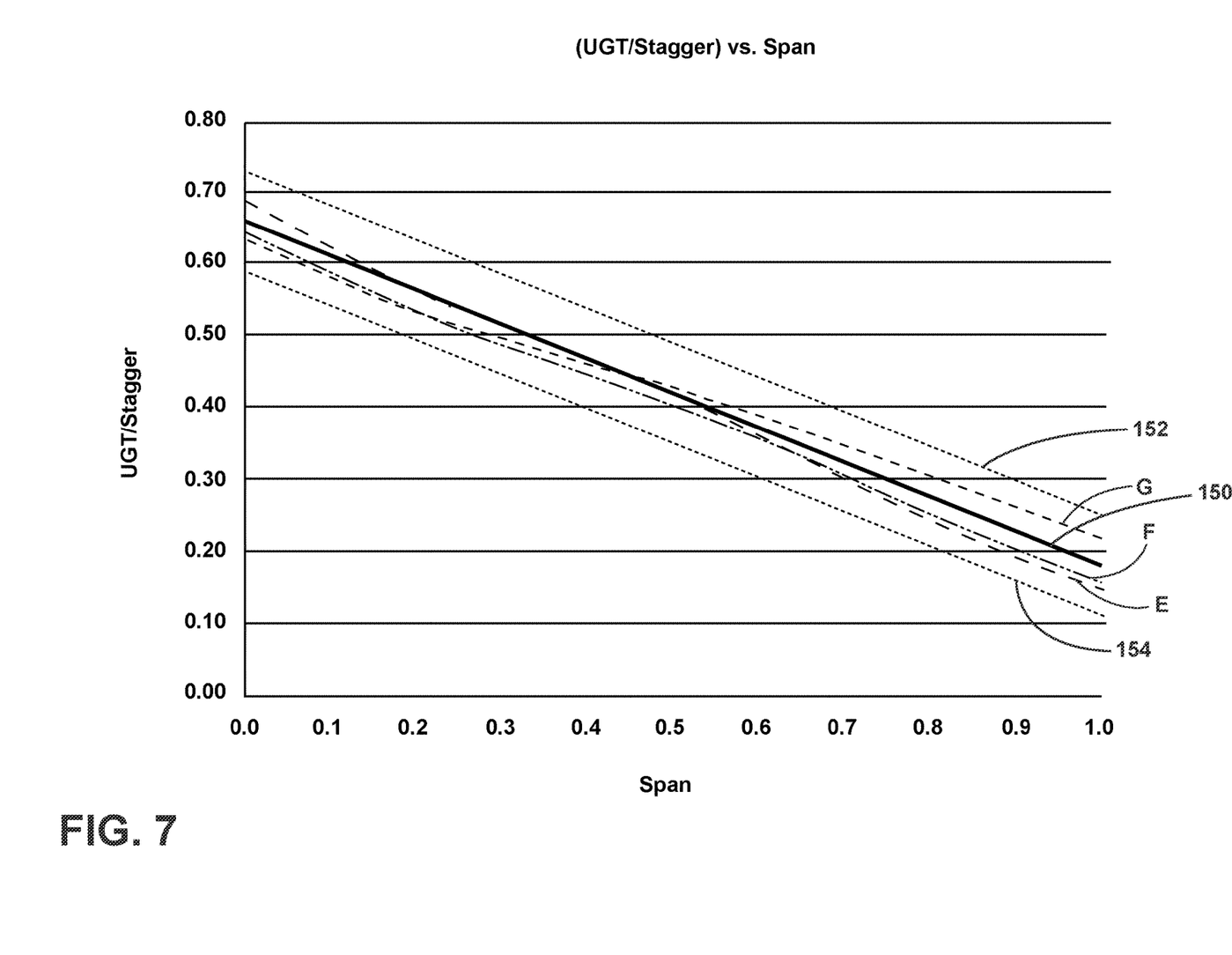
FIG. 7 is a graph of a ratio of unguided turning angle value to stagger angle value versus a span length location.

Turning to FIG. 7, a graph of a ratio (UGT/stagger) of the UGT angle (θ) to the stagger angle (β) vs the span length (SL) percentage is illustrated. The varying solidity values 'E', 'F', and 'G' are also illustrated. It has been found, and it can be seen in the graph, that regardless of the solidity value, the relationship that occurs is very nearly linear and illustrated by line 150.

All of the varying solidity values 'E', 'F', and 'G' fall within bounds illustrated by upper bound line 152 and lower bound line 154. The y-intercept between these bounds can vary by a value of 0.2, or ±0.1 from line 150. This relationship is represented by equation (1) below. Equation (2)

below describes the upper bound line 152 of the graph. Equation (3) below describes the lower bound line 154 of the graph.

$$UGT{:}S = -0.48SL + 0.66 \pm 0.1. \quad (1)$$

$$UGT{:}S = -0.48SL + 0.73 \quad (2)$$

$$UGT{:}S = -0.48SL + 0.59 \quad (3)$$

It is further contemplated that the upper and lower bound lines 152, 154 are separated by a value of 0.14, or ±0.07 from line 150. Further the range can be a value of 0.10, or ±0.05 from line 150. It is even further contemplated that the upper and lower bound lines 152, 154 are separated by a value of 0.06, or ±0.03 from line 150. It should be understood that a narrowing of the range increases the optimization of the airfoil profile 250. In accounting for solidity, the equation (1) enables co-adjustment of the stagger angle ($\beta$) and the UGT angle ($\theta$). Optimizing the stagger angle ($\beta$) at the tip 94 increases efficiency while decreasing tip losses. Since UGT and stagger are both related to solidity, with a similar functional relationship, the ratio of UGT/Stagger enables a definition for an optimal 3D airfoil loading distribution for any chosen solidity. For an unshrouded blade, optimal 3D loading distribution implies maximum mitigation of the leakage loss at the blade tip and passage vortex loss at the hub. Several trends become apparent when examining the optimal configurations represented by FIG. 7:

1) To control hub vortex growth, UGT tends to be high and stagger tends to be low at the blade hub.

2) To control leakage vortex strength at the tip, the UGT tends to be low and stagger tends to be high at the blade tip.

3) UGT and stagger are both highly dependent on solidity, where lower solidity designs tend to require higher levels of stagger and UGT at all spans due to increased spacing and lift-per-airfoil requirements.

Figure 8:
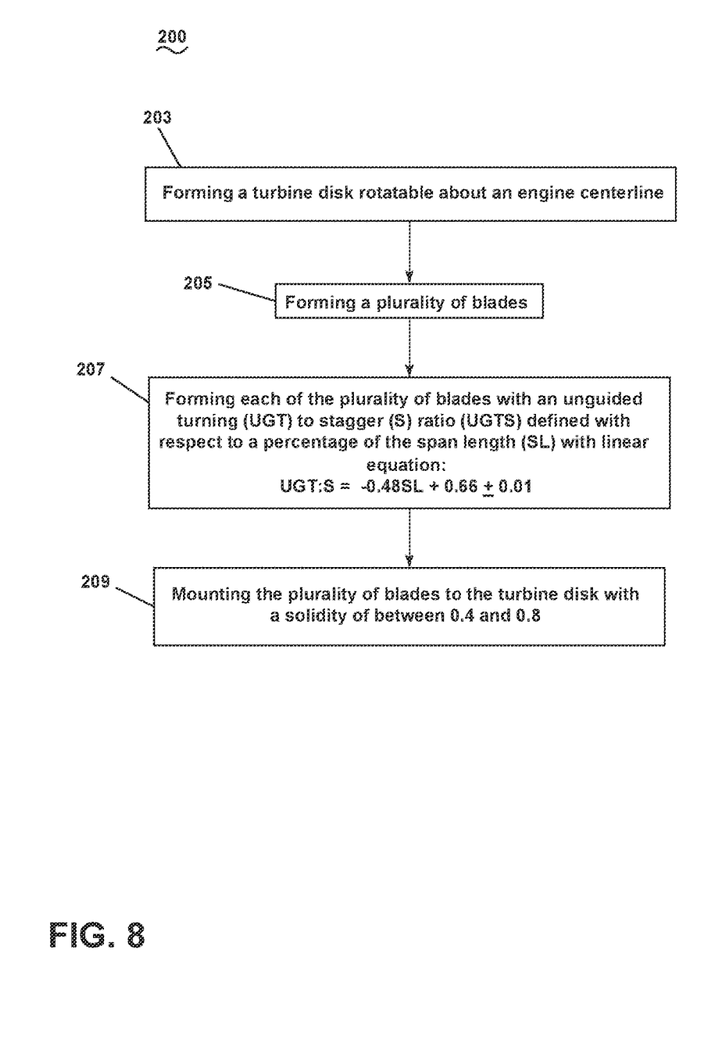
FIG. 8 is a method of forming a turbine disk with a plurality of blades according to the disclosure herein.

Turning to FIG. 8, a flow chart illustrating a method 200 of forming an engine component is illustrated. The method includes at block 203 forming the turbine disk 71 rotatable about the centerline 12. At block 205 forming the plurality of turbine blades 68 described herein with a first side 106 defining the pressure side and a second side 108 defining the suction side. At block 207 forming each of the plurality of blades with the unguided turning (UGT) to stagger (S) ratio (UGT:S) defined with respect to a percentage of the span length (SL) with linear equation (1) as described herein: UGT:S=—0.48SL+0.66±0.1. The method can further include at block 209 mounting the plurality of turbine blades 68 to the turbine disk 71 with a solidity of between 0.4 and 0.8.

Benefits associated with the disclosure as described herein include improvement to turbine efficiency and in turn overall specific fuel consumption (SFC), for a given solidity level. The disclosure herein enables lower solidity designs with higher performance than a traditional design. This results in a larger SFC gain by reducing the amount of required cooling flow due to a decreased number of blades to cool. Along with improved SFC, a lower solidity can reduce initial and service costs because of a lower part count.

The cooling passages as described herein can be produced by additive and advanced casting manufacturing technologies.

It should be appreciated that application of the disclosed design is not limited to turbine engines with fan and booster sections, but is applicable to turbojets and land-based turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An airfoil for a turbine engine, the airfoil comprising an outer wall bounding an interior, defining a pressure side and a suction side, extending between a leading edge and a trailing edge, and extending between a root and a tip to define a span length; wherein the airfoil has an unguided turning angle to stagger angle ratio (UGT:S) defined with respect to a percentage of the span length (SL) with linear equation: UGT:S=−0.48SL+0.66±0.1.

The airfoil of any preceding clause wherein a y-intercept of the linear equation has a range of ±0.07.

The airfoil of any preceding clause wherein a y-intercept of the linear equation has a range of ±0.03.

The airfoil of any preceding clause further comprising an inflection point along the pressure side.

The airfoil of any preceding clause wherein at least a portion of the leading edge includes an enlarged portion terminating at the inflection point.

The airfoil of any preceding clause further comprising cooling passages in the interior.

The airfoil of any preceding clause wherein the tip is unshrouded.

The airfoil of any preceding clause wherein the airfoil is a blade.

An engine component for a turbine engine having a working airflow separated into a cooling airflow and a combustion airflow, the engine component comprising a plurality of circumferentially spaced airfoils rotatable about an centerline defining an axial direction, each airfoil comprising an outer wall bounding an interior, defining a pressure side and a suction side, extending between a leading edge and a trailing edge to along a chord-wise direction to define a chord line, and extending between a root and a tip along a span-wise direction to define a span length; wherein each of the airfoils have an unguided turning angle to stagger angle ratio (UGT:S) defined with respect to a percentage of the span length (SL) with linear equation: UGT:S=−0.48SL+0.66±0.1.

The engine component of any preceding clause wherein the plurality of airfoils have a solidity of between 0.4 and 0.8.

The engine component of any preceding clause wherein the plurality of airfoils comprises consecutive first and second airfoils spaced from each other to define a throat having a width defined as the minimum distance between the trailing edge of the first airfoil and a point along the suction side of the second airfoil.

The engine component of any preceding clause wherein the unguided turning angle is a measured angle between a first line tangent to the suction side of the second airfoil at the point and a second line tangent to the trailing edge of the second airfoil along the suction side.

The engine component of any preceding clause wherein the stagger is a measured angle between an axial line intersecting the trailing edge and extending parallel to the centerline 12 and the chord line.

The engine component of any preceding clause wherein a y-intercept of the linear equation has a range of ±0.07.

The engine component of any preceding clause wherein a y-intercept of the linear equation has a range of ±0.03.

The engine component of any preceding clause wherein at least one of the plurality of airfoils includes an inflection point along the pressure side.

The engine component of any preceding clause wherein at least a portion of the leading edge includes an enlarged portion terminating at the inflection point.

The engine component of any preceding clause wherein the tip is unshrouded.

A method of forming an engine component, the method comprising forming a turbine disk rotatable about an centerline; forming a plurality of blades, each blade comprising a wall having a first side and a second side, each side extending between a root and a tip along a radial direction to define a span length; and forming each of the plurality of blades with an unguided turning (UGT) to stagger (S) ratio (UGT:S) defined with respect to a percentage of the span length (SL) with linear equation: $UGT:S=-0.48SL+0.66\pm0.07$.

The method of any preceding clause further comprising mounting the plurality of blades to the turbine disk with a solidity of between 0.4 and 0.8.

What is claimed is:

1. An airfoil for a turbine engine, the airfoil comprising:
    an outer wall bounding an interior, defining a pressure side and a suction side, extending between a leading edge and a trailing edge, and extending between a root and a tip to define a span length;
    wherein the airfoil has an unguided turning angle to stagger angle ratio (UGT:S) defined with respect to a percentage of the span length (SL) bounded by the relationship:

$UGT:S=-0.48SL+0.66\pm0.1$.

2. The airfoil of claim 1 wherein the lower bound and the upper bound of the relationship are separated by a range of ±0.07.

3. The airfoil of claim 1 wherein the lower bound and the upper bound of the relationship are separated by a range of ±0.03.

4. The airfoil of claim 1 further comprising an inflection point along the pressure side.

5. The airfoil of claim 4 wherein at least a portion of the leading edge includes an enlarged portion terminating at the inflection point.

6. The airfoil of claim 5 further comprising cooling passages in the interior.

7. The airfoil of claim 1 wherein the tip is unshrouded.

8. The airfoil of claim 1 wherein the airfoil is a blade.

9. An engine component for a turbine engine having a working airflow separated into a cooling airflow and a combustion airflow, the engine component comprising:
    a plurality of circumferentially spaced airfoils rotatable about a centerline defining an axial direction, each airfoil comprising:
        an outer wall bounding an interior, defining a pressure side and a suction side, extending between a leading edge and a trailing edge along a chord-wise direction to define a chord line, and extending between a root and a tip along a span-wise direction to define a span length;
        wherein each airfoil has an unguided turning angle to stagger angle ratio (UGT:S) defined with respect to a percentage of the span length (SL) bounded by the relationship:

$UGT:S=-0.48SL+0.66\pm0.1$.

10. The engine component of claim 9 wherein the plurality of airfoils have a solidity of between 0.4 and 0.8.

11. The engine component of claim 9 wherein the plurality of airfoils comprises consecutive first and second airfoils spaced from each other to define a throat having a width defined as a minimum distance between the trailing edge of the first airfoil and a point along the suction side of the second airfoil.

12. The engine component of claim 11 wherein the unguided turning angle is a measured angle between a first line tangent to the suction side of the second airfoil at the point and a second line tangent to the trailing edge of the second airfoil along the suction side.

13. The engine component of claim 9 wherein the stagger angle is a measured angle between the chord line and an axial line intersecting the trailing edge and extending parallel to the centerline.

14. The engine component of claim 9 wherein the lower bound and the upper bound of the relationship are separated by a range of ±0.07.

15. The engine component of claim 9 wherein the lower bound and the upper bound of the relationship are separated by a range of ±0.03.

16. The engine component of claim 9 wherein at least one of the plurality of airfoils includes an inflection point along the pressure side.

17. The engine component of claim 16 wherein at least a portion of the leading edge includes an enlarged portion terminating at the inflection point.

18. The engine component of claim 9 wherein the tip is unshrouded.

19. A method of forming an engine component, the method comprising:
    forming a turbine disk rotatable about a centerline;
    forming a plurality of blades, each blade comprising a wall having a first side and a second side, each side extending between a root and a tip along a radial direction to define a span length; and
    forming each of the plurality of blades with an unguided turning to stagger ratio (UGT:S) defined with respect to a percentage of the span length (SL) bounded by the relationship:

$UGT:S=-0.48SL+0.66\pm0.07$.

20. The method of claim 19 further comprising mounting the plurality of blades to the turbine disk with a solidity of between 0.4 and 0.8.

* * * * *